J. V. WOFFORD.
COTTON PICKER.
APPLICATION FILED APR. 12, 1920.
1,364,670. Patented Jan. 4, 1921.
2 SHEETS—SHEET 1.
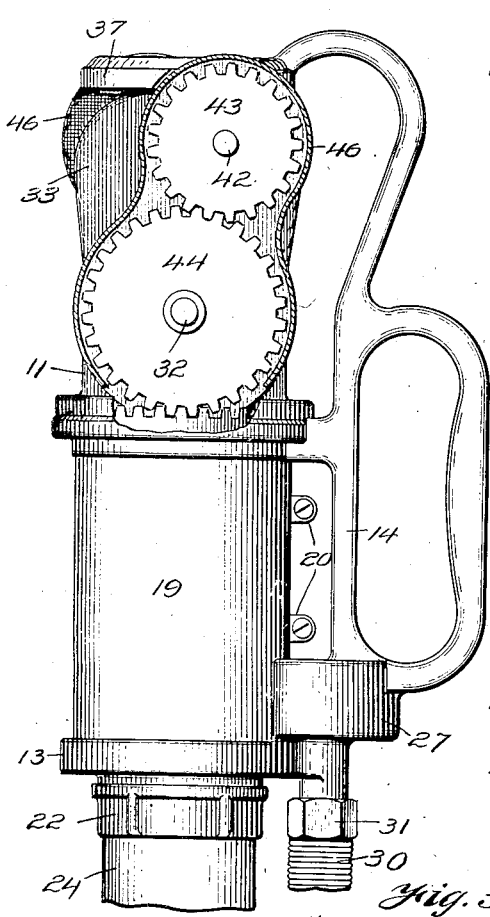
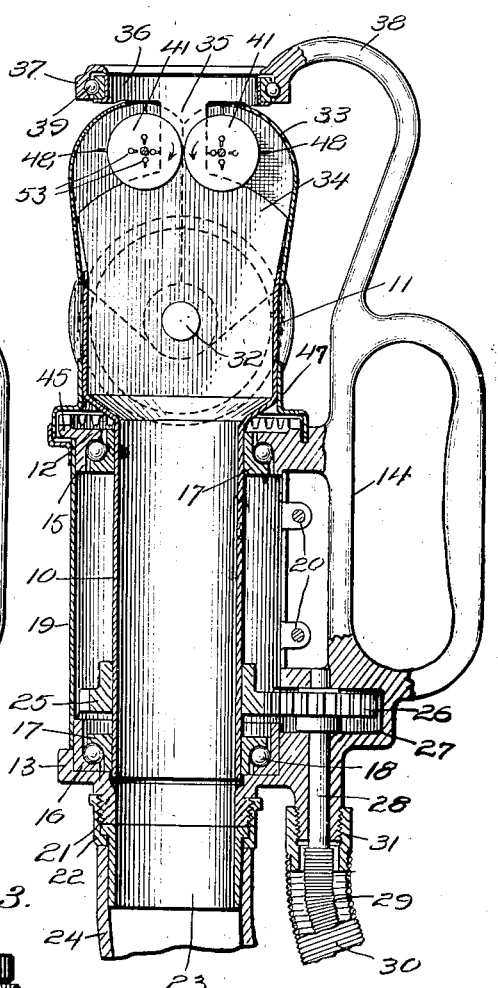
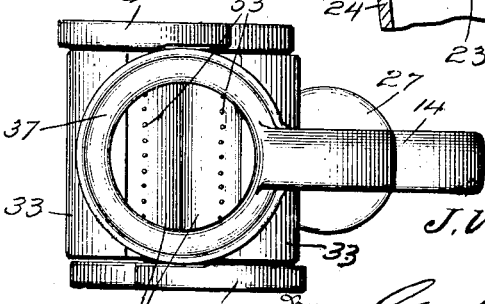
Inventor
J. V. Wofford.
By Geo. P. Kimmel.
Attorney

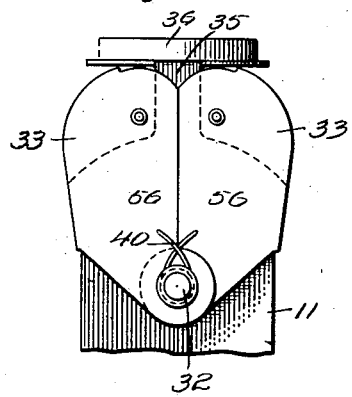
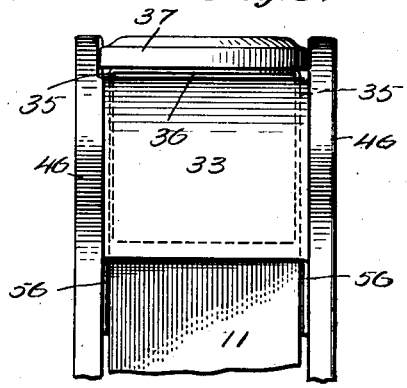
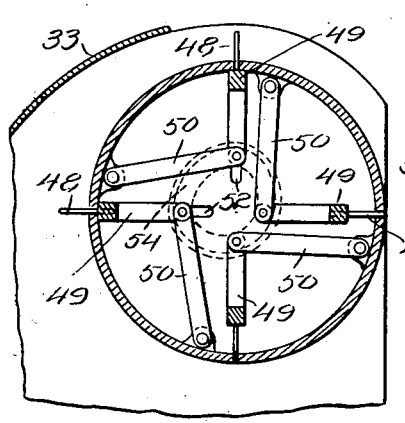
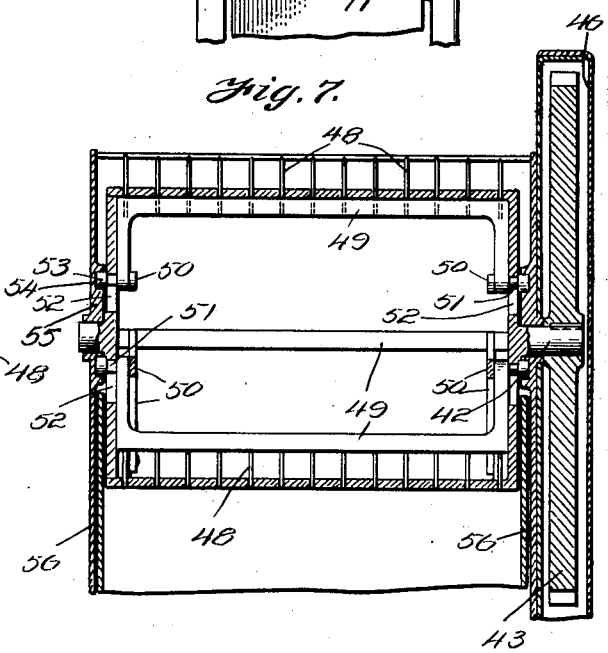
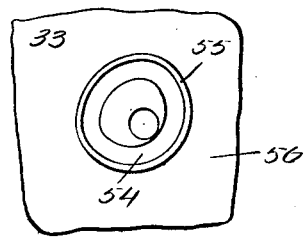

UNITED STATES PATENT OFFICE.

JOSEPH V. WOFFORD, OF CATOOSA, OKLAHOMA.

COTTON-PICKER.

1,364,670.  Specification of Letters Patent.  Patented Jan. 4, 1921.

Application filed April 12, 1920. Serial No. 373,195.

*To all whom it may concern:*

Be it known that I, JOSEPH V. WOFFORD, a citizen of the United States, residing at Catoosa, in the county of Rogers and State of Oklahoma, have invented certain new and useful Improvements in Cotton-Pickers, of which the following is a specification.

The invention relates to a picker head, and more particularly to the class of pneumatic cotton picking heads.

The primary object of the invention is the provision of a pneumatic cotton picking head, wherein the suction nozzle thereof is rotatably supported and carries mouth sections which are pivotally mounted for opening and closing movements while within these mouth sections are positively driven cotton picker rollers having teeth, the latter being movably supported so as to be positioned for the removal of the cotton growing upon a plant, and the freeing of said cotton after entrance thereof in the nozzle; thus in the use of the head, the cotton will be pulled therefrom, not only by a drawing action but by a twisting action and when the cotton is removed from said plant it will be sucked into the nozzle in the head for conveyance to a point of deposit.

Another object of the invention is the provision of a pneumatic cotton picking head, wherein the suction nozzle is driven positively for rotatable movement therein so that the picker rollers which are supported within the mouth of said nozzle will be revolved with said nozzle and also positively rotated so that the cotton fiber growing upon a plant can be extracted therefrom not only by the drawing action of the picker rollers thereon, and the suction within the nozzle but through a twisting movement by the rotation of the nozzle, thereby assuring the positive withdrawal of the cotton fiber from the plant with despatch and also with the assurance that all the cotton fiber will be taken into the picker head with despatch and without excessive manual manipulation thereof.

A further object of the invention is the provision of a picker or head of this character wherein the same is carried in the hand of an operator and can be presented to the cotton upon the plant so that said cotton will be extracted therefrom both by a pulling and twisting action for the subsequent deposit of the picked cotton by suction action through the head.

A still further object of the invention is the provision of a picker head of this character, wherein the driving connections between the suction nozzle and the picker rollers are located externally thereof and completely housed so that the user of the head cannot be injured by the driven connections and the same will be concealed to avoid cotton fiber working into the same and thus retarding the action thereof in the use of the head.

A still further object of the invention is the provision of a pneumatic picker head of this character, wherein the construction thereof is novel in form, so that in the operation thereof the cotton fiber will be positively drawn or picked off of a plant having the same thereon and the picking of the cotton fiber will be effected by a drawing and twisting action, by the head.

A still further object of the invention is the provision of a cotton picker head of this character, which is comparatively simple in construction, thoroughly reliable and efficient in its purpose, strong, durable, and inexpensive to manufacture.

With these and other objects in view the invention consists in the features of construction, combination and arrangement of parts as will be hereinafter fully described, illustrated in the accompanying drawings and pointed out in the claims hereunto appended.

In the accompanying drawings:

Figure 1 is a side elevation of a pneumatic cotton picker head, constructed in accordance with the invention, showing a portion of the gear housing broken away.

Fig. 2 is a fragmentary vertical longitudinal sectional view thereof.

Fig. 3 is a top plan view.

Fig. 4 is a fragmentary side elevation showing in detail the pivotally mounted mouth sections of the head.

Fig. 5 is a fragmentary elevation looking from front of said head.

Fig. 6 is a fragmentary enlarged vertical sectional view through one of the mouth sections and picker rollers, showing in detail the movable picker teeth and the controlling mechanism therefor.

Fig. 7 is a fragmentary vertical transverse sectional view, through one of the swinging mouth sections and picker rollers showing in detail the mechanism for controlling the picker teeth, associated with said picker roller.

Fig. 8 is a fragmentary elevation looking toward the inner face of one side of one of the mouth sections, showing in detail the cam for operating the mechanism for the picker teeth interiorly of the picker roller.

Similar reference characters indicate corresponding parts throughout the several views in the drawings.

Referring to the drawings in detail, the pneumatic cotton picker head comprises an inner tubular suction nozzle 10 formed at its outer end with an enlarged substantially square shaped throat 11, the nozzle being rotatably supported in stationary circular shaped or ring-like spaced brackets 12 and 13, respectively, of a handle 14, the bracket 12 being formed at its inner periphery with a ball cone surface 15, while seated within the bracket 13 is a cone 16, which latter with the cone surface 15, coöperate with companion ball cones 17, fitted securely upon the nozzle 10 for retaining bearing balls 18 therebetween so that the nozzle 10 will freely rotate within the brackets 12 and 13 of the handle 14 with minimum friction.

Arranged between the brackets 12 and 13, and surrounding the nozzle 10, is an outer casing 19, which is longitudinally slitted and fastened at 20, upon the brackets to inclose said nozzle 10. The bracket 13 is formed with an exteriorly threaded nipple 21, with which is detachably engaged, an internally threaded locking collar 22, carrying a coupling sleeve 23, with which is engaged the outer end of a flexible suction hose 24, the latter being adapted for connection with a suitable source of suction and is adapted to convey the picked cotton therethrough to a point of deposit.

Fixed to the nozzle 10, exteriorly thereof, is a driven gear 25, with which meshes a driven pinion 26 accommodated within a suitable recess 27, formed in the handle 14, the pinion 26, being fixed to the terminal stub spindle 28 of a flexible driving or power shaft 29, operated from any suitable power source, the shaft 29 being within a flexible tubing 30 which through the coupling 31 is detachably engaged with the handle 14 at the inner end thereof. It will be apparent that the flexible shaft 29 at the terminal spindle 28 and pinion 26, meshing with the gear 25, will rotate the nozzle 10 for imparting movement thereto the terminal spindle 28 of said shaft 29, being suitably journaled in the handle 14, as is clearly shown in Fig. 2 of the drawings.

Mounted in opposite sides of the throat 11 of the nozzle 10 are transversely alining pivot studs 32, on which are swingingly supported movable opening and closing mouth sections 33, the sides 34 of the throat 11 carrying the pivot studs 32 being extended and are formed with connecting webs 35, joining therewith a mouth ring 36 which rotatably fits within a mouth cap 37 integrally formed with a substantially gooseneck shaped arm 38 of the handle 14, the cap 37 and the mouth ring 36 being fitted with bearing balls 39 to minimize friction at the mouth end of the head, constituted by the said ring 6, and cap 37.

The mouth sections 33 are normally held closed relative to each other through the medium of a tension spring 40 carried upon one of the pivot studs 32 and on the admission of a quantity of cotton extracted by the picker head into the latter, the movable mouth sections 33 will automatically swing apart against the resistance of the spring 40 to accommodate the picked cotton and allow the same to pass therebetween and into the throat 11 for the suction thereof through the nozzle 10 into the hose 24, for the conveying of said picked cotton thereby to the point of deposit therefrom.

Journaled transversely in the mouth sections 33, contiguous to the outer ends thereof and adjacent to the mouth ring 36, are rotatable picker rollers 41, each being of hollow formation and has one journal 42 thereof fitted with a driven gear 43, these gears for both rollers 41 being disposed at opposite sides of the head and mesh with companion driven gears 44, loosely journaled upon the pivot studs 32, while formed integrally with the bracket 12, is a crown gear 45 with which mesh the said gears 44 so that on rotation of the nozzle 10, motion will be imparted through the gears directly to the picker rollers 41 for the rotation thereof within the mouth sections 33, the rollers 41 being rotated in reverse directions to each other on the turning of the throat 11 and the mouth sections 33 pivoted thereto. It will be apparent that the gear 45 meshes with the gears 44 and which in turn mesh with the gears 43, the latter being fixed to the shafts 42 of the picker rollers 41 so that the same are positively driven, the gears 43 being located diagonally opposite each other at opposite sides of the head.

Suitably connected with each mouth section 33 and adapted to swing therewith is a gear housing 46 which incloses the gear 43 and its companion gear 44, said housing 46 being adapted to swing upon the pivot stud 32 on the opening and closing movement of the mouth section 33 in the operation of the picker head.

Embracing the throat 11, of the nozzle 10 is a guard 47, which covers the crown gear 45 to conceal the same in the picker head.

In each of the rollers 41 at diametrically opposite points are formed a series of suitable openings, through which are adapted to work picker teeth or fingers 48 carried upon shiftable frames 49 interiorly of said roller 41 and pivotally connected to rocking links 50, which are also pivoted for movement to said roller for guiding the frames in their movements, the pivots 51 connecting the links 50 to each frame 49 being projected through lateral slots 52 formed in opposite ends of said roller 41, these pivots 51 being provided with heads 53 which project into cam grooves 54, formed in the thickened portions 55 of the side walls or cheeks 56 of the mouth section 33 so that when the roller 43 rotates, the frames 49 will be moved to project the picker fingers or teeth 48 externally of the roller 41 for a predetermined period of time and at proper intervals to enable the teeth or fingers 48 to grab and pull off the cotton fiber from the growing plant or pick the said cotton fiber therefrom and deliver it between the adjacent picker rollers 41 into the picker head, whence the loose cotton fiber will be sucked into the throat 11 thereof and conveyed through the nozzle 10 into the hose 24 for deposit therefrom. It will be apparent that the picker teeth or fingers 48 will be retracted in the rollers 41 at the closest points of the peripheries of said rollers relative to each other so as to free the loose cotton when passing between the rollers so that said loose cotton will be drawn into the throat 11 of the head under the suction section in the nozzle 10 of said head and thereby avoid any possibility of the choking of the head at the mouth end thereof.

When the rollers 41 are rotated and the fingers or teeth 48 become active upon the cotton fiber on the plant, a twisting action is set up by the rotation of the nozzle 10 and throat 11 in the head so that the cotton is not only pulled upon, but twisted during the drawing action from the plant in the use of the head and thus assuring the picking off of the cotton from the plant with despatch and ease.

It will be apparent that the movable sections 33 automatically adjust themselves relative to each other accordingly to the quantity of cotton passing between the picker rolls 41 in the head and in this manner the possibility of stopping up of the head or the choking thereof is entirely eliminated and at the same time a maximum quantity of cotton can be picked from the plant in the use of the head.

The salient feature in the construction and arrangement hereinbefore set forth resides in the drawing and twisting action set up within the head by the turning of the nozzle 10 and throat 11 thereof and the rotation of the picker rollers 41 within the mouth sections 33, so that when the cotton upon the plant is being extracted the same is not only pulled upon to remove said cotton, but is twisted from said plant, thereby assuring the easy and quick removal of the cotton in the use of the picker head. When the cotton is pulled and twisted from the plant and is passed from between the rollers 41 into the throat 11, the loose cotton is drawn through the nozzle 10 under the suction set up in the hose 24, from any suitable suction source and conveyed through said hose 24 to the desired point of deposit.

From the foregoing, it is thought that the construction and manner of operation of the picker head will be clearly understood and therefore a more extended explanation has been omitted.

What is claimed is:

1. A pneumatic cotton picker head comprising a rotatable suction nozzle having a throat, pivoted mouth sections on the throat, means for tensioning the mouth sections to hold the same normally closed relative to each other, rotatable picking mechanism within the mouth sections, means geared with the throat to effect rotation thereof, and gear connections between the picker picking mechanism and said throat for transmitting motion from the latter to said picking mechanism.

2. A pneumatic cotton picker head comprising a rotatable suction nozzle having a throat, pivoted mouth sections on the throat, means for tensioning the mouth sections to hold the same normally closed relative to each other, rotatable picking mechanism within the mouth sections, means geared with the throat to effect rotation thereof, gear connections between the picker picking mechanism and said throat for transmitting motion from the latter to said picking mechanism, and a mouth ring extended beyond the mouth sections.

3. A pneumatic cotton picker head comprising a rotatable suction nozzle having a throat, pivoted mouth sections on the throat, means for tensioning the mouth sections to hold the same normally closed relative to each other, rotatable picking mechanism within the mouth sections, means geared with the throat to effect rotation thereof, gear connections between the picker picking mechanism and said throat for transmitting motion from the latter to said picking mechanism, a mouth ring extended beyond the mouth sections, and an arm having supports for said throat and also provided with a bearing cap for the mouth ring.

4. The picker head having a rotatable suction nozzle provided with pivoted mouth sections adapted for opening and closing movements, and picker mechanism located wholly within the pivoted sections and having automatically projected and retrieving picker fingers.

5. A pneumatic cotton picker head comprising a handle having brackets, a rotatable suction nozzle fitted within the brackets, driven means carried by the handle for imparting rotation to the nozzle, mouth sections carried by the nozzle, picker mechanism within the mouth sections, and driven connections for imparting movement to the picker mechanism on rotation of said nozzle.

6. The picker head having a rotatable suction nozzle provided with pivoted mouth sections adapted for opening and closing movements, picker mechanism located wholly within the pivoted sections and having automatically projected and retrieving picker fingers, and means for simultaneously rotating the throat and actuating the picker mechanism.

7. The picker head having a rotatable suction nozzle provided with pivoted mouth sections adapted for opening and closing movements, picker mechanism located wholly within the pivoted sections and having automatically projected and retrieving picker fingers, means for simultaneously rotating the throat and actuating the picker mechanism, and a non-rotatable hand grip carrying said nozzle.

8. In a picker head a rotatable suction throat having a nozzle adapted for communication with a suction pipe, a handle for the carriage of said throat and nozzle, driven means for imparting rotation to the throat, open mouth sections movably supported on the throat and normally in close relation to each other, picker rollers journaled within the mouth sections, picker fingers carried by the rollers and movable with respect thereto to projected and retracted positions, and mechanism for rotating the rollers and operable on rotation of the throat.

9. In a pneumatic cotton picker head, a handle having brackets, a rotatable nozzle fitted within the brackets, a casing between the brackets and inclosing the nozzle, a throat formed on said nozzle, a stationary crown gear carried by one of the brackets, pivoted mouth sections supported upon the throat, picker rollers journaled in the mouth sections, gear connections between the rollers, and said stationary crown gear, whereby rotation of said rollers will be had on the rotation of the nozzle in the brackets, and means for imparting rotation to the nozzle.

10. In a pneumatic cotton picker head, a handle having brackets, a rotatable nozzle fitted within the brackets, a casing between the brackets and inclosing the nozzle, at throat formed on said nozzle, a stationary crown gear carried by one of the brackets, pivoted mouth sections supported upon the throat, picker rollers journaled in the mouth sections, gear connections between the rollers, and said stationary crown gear, whereby rotation of said rollers will be had on the rotation of the nozzle in the brackets, and means for imparting rotation to the nozzle, and picker fingers carried by the rollers and movable outwardly thereof and inwardly of the same, and means for operating the fingers to effect movement thereof at proper intervals during the rotation of the rollers.

In testimony whereof, I affix my signature hereto.

JOSEPH V. WOFFORD.